United States Patent [19]
Kubota et al.

[11] Patent Number: 5,024,094
[45] Date of Patent: Jun. 18, 1991

[54] ULTRASONIC IMAGING SYSTEM OF BONDING ZONE

[75] Inventors: Jun Kubota; Hirotoshi Kino, both of Hitachi; Yosinori Musha, Hitachiota; Hisao Okada, Hitachi, all of

[73] Assignee: Hitaci, Ltd., Tokyo, Japan

[21] Appl. No.: 282,496

[22] Filed: Dec. 12, 1988

[30] Foreign Application Priority Data

Dec. 15, 1987 [JP] Japan .............................. 62-316882

[51] Int. Cl.$^5$ .............................................. G01N 29/06
[52] U.S. Cl. ......................................... 73/634; 73/620
[58] Field of Search ................. 73/626, 634, 620, 588; 128/660.01

[56] References Cited

U.S. PATENT DOCUMENTS

| | | | |
|---|---|---|---|
| 4,180,790 | 12/1979 | Thomas | 73/626 |
| 4,241,610 | 12/1980 | Anderson | 73/626 |
| 4,328,707 | 5/1982 | Clement et al. | 73/626 |
| 4,387,597 | 6/1983 | Brandestini | 73/626 |
| 4,398,539 | 8/1983 | Proucian | 73/626 |
| 4,410,826 | 10/1983 | Waxman et al. | 73/644 |
| 4,472,973 | 9/1984 | Sugai et al. | 73/626 |
| 4,534,221 | 8/1985 | Fife et al. | 73/626 |
| 4,566,459 | 1/1986 | Umemura et al. | 73/626 |

FOREIGN PATENT DOCUMENTS 4637318 11/1968 Japan .
7141549 9/1982 Japan .

Primary Examiner—Hezron E. Williams
Assistant Examiner—Rose M. Finley
Attorney, Agent, or Firm—Antonelli, Terry, Stout & Kraus

[57] ABSTRACT

In a system for irradiating an ultrasonic beam and imaging the insides of plate-shaped and layer-shaped samples, by using the difference between the sound velocities of a liquid medium and a sample from an ultrasonic transducer to the surface of the sample, the focusing condition is arithmetically operated from the distance between the transducer and the imaging surface which is obtained from the surface echo, and a focal point is set to an arbitrary surface in the sample, thereby correcting a phenomenon such that the focal point of the ultrasonic beam focused into the sample non-linearly moves. Thus, even if the sample is distorted, curved, or inclined, the surface can be imaged at a high resolution and a finer imaging picture can be obtained.

11 Claims, 3 Drawing Sheets

ULTRASONIC IMAGING SYSTEM OF BONDING ZONE

BACKGROUND OF THE INVENTION

The present invention relates to a system for imaging defects in a material of a plate- and layer-shaped structure by area-scanning an ultrasonic beam through a liquid medium and, more particularly, to an ultrasonic imaging system having an arithmetic operation control unit suitable for the high resolution imaging of a material of a distorted surface.

A conventional ultrasonic flaw detector system to three-dimensionally scan a test sample having a curved shape has been disclosed in JP-A-46-37318. This system discloses a basic method in which phases of transmission signals of a plurality of adjacent transmitting elements are so controlled that a focal point is formed in the sample and the image is displayed by the echoes from the focal point zone. However, no consideration is give to a method of controlling the focal point to an arbitrary depth under the surface of the sample. On the other hand, the principle that the focal point can be moved has also been known in JP-A-57-141549. However, this method has a drawback such that when the distance to the surface (incident point to a sample) changes, the focal point moves and this movement is not linear due to the difference of the sound velocities. Thus, this movement cannot be corrected by known means.

When a bonding zone of a layered structure of a test sample is extended along the imaging surface of the sample, in general, the distance from the imaging surface to the bonding zone to be imaged (hereinafter, referred to as an imaging object zone) is approximately known from a design value or the like. However, when the imaging surface is distorted or is a curved surface or when the imaging surface is inclined although it is flat surface, the distance in the liquid medium from the ultrasonic irradiating surface of the ultrasonic converter to the imaging surface (hereinafter, this distance is referred to as a medium distance) is not constant. The sound velocities in the liquid medium and in the sample differ. Therefore, the movement of the focal point is not linear. It is difficult to control the movement of the focal point so as to focus onto the imaging object zone. For instance, when the liquid medium is water and the sample is a silicon crystal plate, the underwater sound velocity $v_w = 1.5$ mm/$\mu$sec and the sound velocity $v_{sl}$ of the longitudinal wave in silicon is $v_{sl} = 8.4$ mm/$\mu$sec and $v_{sl}$ is 5.6 times as large as $v_w$. Therefore, even if the distortion of the imaging surface is about 20 $\mu$m, an error of about 110 $\mu$m occurs in silicon. Thus, the error is magnified.

SUMMARY OF THE INVENTION

It is an object of the present invention to eliminate the drawbacks of the conventional techniques and to provide an ultrasonic imaging system which can control a focal zone in a sample irrespective of a slight distortion of the surface shape.

According to the present invention, there is provided an ultrasonic imaging system of a bonding zone including ultrasonic transmitting/receiving means for focusing an ultrasonic beam and transmitting and receiving it. A pulse generating means is included for supplying high frequency pulses at a time set in the ultrasonic transmitting/receiving means. A receiving means is included for receiving and amplifying the ultrasonic signal received by the ultrasonic transmitting/receiving means. A switching means is also included for connecting the pulse generating means with the ultrasonic transmitting/receiving means in the transmitting mode and for connecting the ultrasonic transmitting/receiving means with the receiving means in the receiving mode. A liquid medium is interposed between the ultrasonic irradiating surface of the ultrasonic transmitting/receiving means and a test sample and an image of an imaging object zone in the sample is produced. This ultrasonic imaging system further includes input means for inputting parameters regarding sound velocities and dimensions of the test sample and liquid medium, a surface echo counter for extracting the echo from the sample surface from an output signal of the receiving means and for measuring the distance between the ultrasonic irradiating surface and the test sample from the transmission timing of the ultrasonic beam and the reception timing of the surface echo, and focal point arithmetic operation control means responsive to the distance measured by the surface echo counter and the output signal from the input means for outputting a signal to control the focal point of the ultrasonic beam.

That is, this system includes means for extracting the surface echo of the sample to be imaged and for measuring the time from the transmission of the ultrasonic beam to the reception of the surface echo and means for calculating and controlling the focal point of the ultrasonic beam in order to focus onto the imaging object zone in the sample from the measured time. The time at which the ultrasonic beam passes through the surface is detected. The conditions such as medium distance which is necessary to focus the beam onto the imaging object delay time of a transmission/reception signal of each vibrating element, and the like are arithmetically calculated based upon such principals as Snell's law or the like from the previously input parameters of the distance between the imaging object zone and the imaging surface, as well as the sound velocity in the sample, and the sound velocity in the liquid. On the basis of the arithmetic calculations, the position of the ultrasonic transmitting/receiving means, the transmission timing of each element, the phase of the reception signal, and the like are controlled. In this manner, the object of the invention is accomplished.

The surface echo counter calculates the time from the transmission of the ultrasonic pulse from the ultrasonic transmitting/receiving means to the reception of the surface echo. The delay time which should be given to the transmission/reception signal of each vibrating element can be obtained from an equation on the basis of the Snell's law such that the ultrasonic beam passes through a path in order to minimize the propagating time from the vibrating element through the sample surface to the focal point. This equation is generally a high-order equation which needs a convergence calculation to be performed in order to solve it. However, by preliminarily calculating a table of a sufficient accuracy from the parameters previously described and storing this table into a memory, and by driving the medium distance measured by the surface echo counter, the delay amount based on the distortion of the sample surface can also be determined. The phase of the transmission/reception signal can be controlled by the delay time obtained as mentioned above, so that a focal zone can be formed to an arbitrary depth in the sample.

DESCRIPTION OF THE PREFERRED EMBODIMENTS

Figure 1:
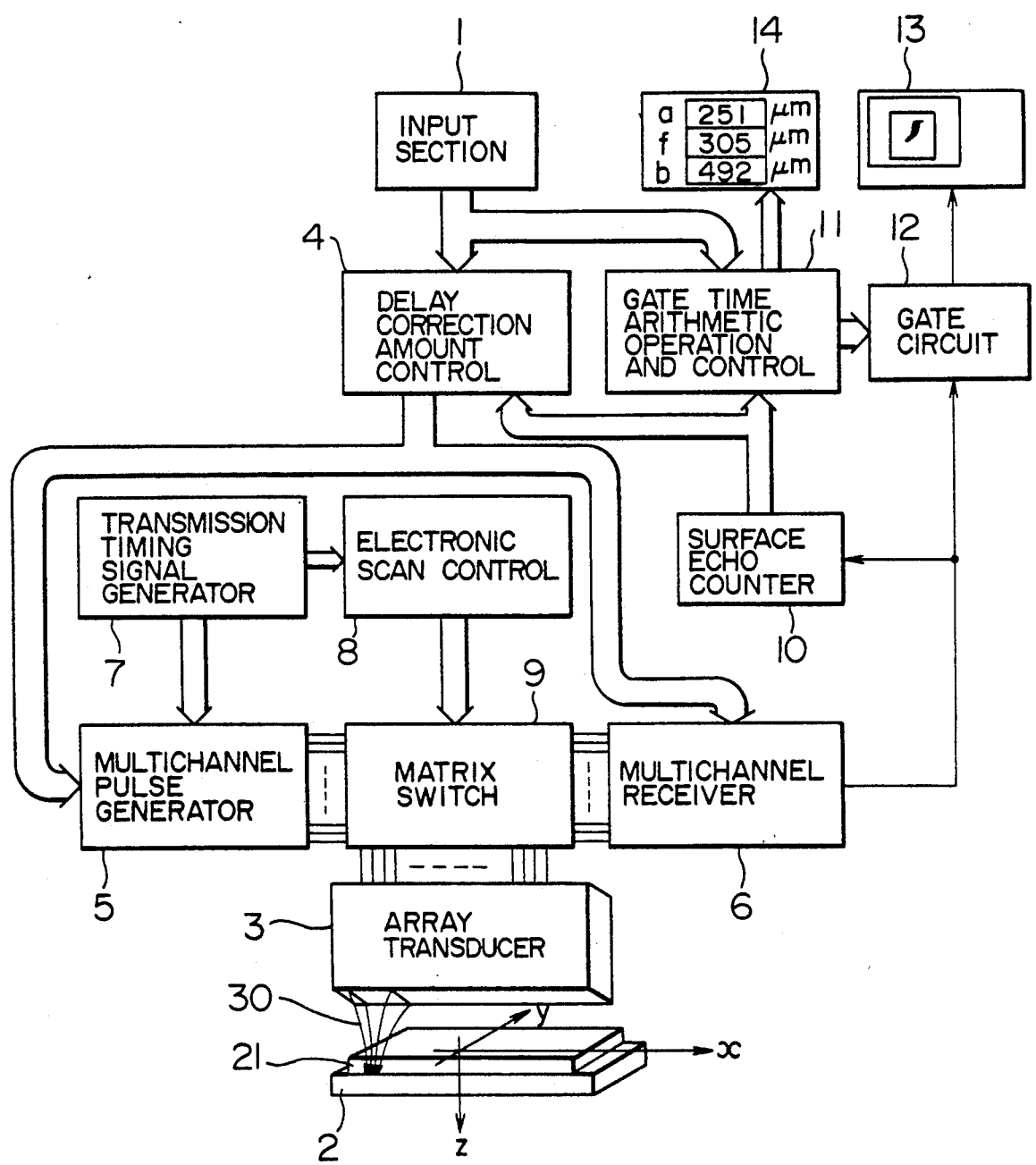
FIG. 1 is a block diagram showing an embodiment of the present invention.

An embodiment of the present invention will be described hereinbelow with reference to FIGS. 1 to 3. The details of FIGS. 2 and 3 will be described later. Parameters which are input to input means 1 include: a sound velocity $v_1$ in a liquid medium; a sound velocity $v_2$ in a sample 2; a distance $Z_f$ from the surface of the sample 2 to an imaging object zone; the number n of elements which are simultaneously driven among N vibrating elements of an array transducer 3; and an element pitch P. A delay correction amount arithmetic operating control section 4 calculates a delay time to be given to the transmission/reception signal of each of the vibrating elements which are simultaneously driven from those parameters which are output from the input means 1 and from the initial value of the medium distance $Z_w$ shown in FIG. 3, thereby controlling a multichannel pulse generator (hereinafter, referred to a pulse generator) 5 as and a multichannel receiver (hereinafter, referred to as a receiver) 6.

The transmitting/receiving operation of an ultrasonic beam from the array transducer 3 is started from a transmission timing signal which is determined by a transmission timing signal generator 7. The vibrating elements are simultaneously driven and determined by an electronic scanning control section 8 and each channel of the pulse generator 5 is connected to a matrix switch 9. Each channel of the pulse generator 5 drives each of the simultaneously driven vibrating elements of the array transducer 3 according to the delay time and generates an ultrasonic beam 30 as shown in FIG. 3. The ultrasonic beam 30 progresses in the liquid medium while it gradually converges. Finally, this ultrasonic beam reaches an imaging surface 21 of the sample 2. In general, since the sound velocity in the sample differs from that in the liquid medium, the degree of convergence of the ultrasonic beam 30 also differs. A part of the ultrasonic beam is reflected by the imaging surface 21 and returned as a surface echo 31 to the array transducer 3 and the remaining ultrasonic beam is further propagated in the sample 2 and reaches the imaging object zone 22, for example a bonding zone, so that an echo 32 is produced. The echoes 31 and 32 are propagated along the same path and received by the array transducer 3 and converted into electric signals. Returning to FIG. 1, the matrix switch 9 connects each of the simultaneously driving vibrating elements with each channel of the receiver 6. The reception echoes are amplified while being subjected to phase correction according to the delay time by the receiver 6 and synthesized. In the output of the receiver 6, the signal which first appears after disappearance of the transmission pulse wave which is generated by the transmission timing signal generator 7 and subsequently was attenuated on the time axis of FIG. 3(b) or (c), corresponds to the surface echo 31. This echo is extracted by a surface echo counter 10. The medium distance $Z_w$ is measured from the time difference between the transmission timing signal and the extracted surface echo 31. A correction amount of delay time to be added to the transmission/reception signal of each vibrating element is newly calculated from the measured medium distance $Z_w$ and the parameters which have been previously input. This new correction amount is set as control data in the next transmission/reception cycle. By repeating these operations, the scanning of the ultrasonic beam is electronically controlled so as to converge the ultrasonic beam onto the imaging object zone.

The distance from the imaging surface 21 of the sample 2 to the imaging object zone is known as a design value. If $Z_w$ is known, the time until the reception of the echo (hereinafter, referred to as an imaging echo) from the imaging object zone is calculated by a gate time arithmetic operation control section 11. The gate is opened or closed by a gate circuit 12 before and after the reception of this echo. The gate circuit 12 extracts the echo received for the period of time when the gate is open and outputs its amplitude to an image display section 13. In the image display section 13, the amplitude of the imaging echo which is received is written as a luminance to the coordinates (x', y') on the image display screen corresponding to the coordinates (x, y) of the center of the group of vibrators which are simultaneously driven in the array transducer 3, thereby forming and displaying an imaging picture. A digital display device 14 displays information regarding the imaging object zone. That is, depths f, a, and b from the surface which respectively correspond to the focal point, time to open the gate, and time to close the gate are displayed as numerals.

Figure 2:
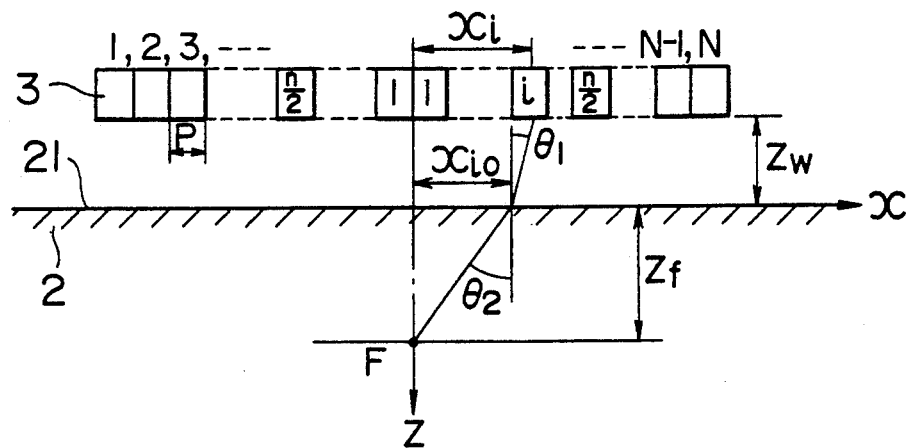
FIG. 2 is a diagram for explaining an influence which is exerted by a change in medium distance on a delay time to be given to a transmission/reception signal of each element of an array converter.

In FIG. 2, the central element in the group of n vibrators which are simultaneously driven is numbered 1. The other elements are sequentially numbered until n/2 for both sides. A vibrator pitch is set to P. Thus, the i-th (i=1, 2, ..., n/2) vibrating element is located at the distance of $x_i$ from the center of the vibrator group.

$$x_i = i \cdot P \tag{1}$$

Assuming that the focal point is set to the imaging object zone, it is sufficient to set the focal point F to a position which is just under the center of the vibrator group at the depth of $Z_f$ from the imaging surface 21. The coordinates at which the wave which is propagated from the element i to the focal point F passes through the surface 21 are $(x_{i0}, 0)$. Snell's law is satisfied between an incident angle $\theta_1$ and an angle $\theta_2$ of refraction=

$$v_2 \sin\theta_1 = v_1 \sin\theta_2 \tag{2}$$

Further, $$x_{i0} = Z_f \tan\theta_2 \tag{3}$$

$$x_i = Z_f \tan\theta_2 + Z_w \tan\theta_1 \tag{4}$$

By using the equations (1) to (4), a propagating time $t_i$ of the ultrasonic beam from the element i to the focal point F is obtained by the following equation.

$$t_i = \sqrt{(x_i - x_{i0})^2 + Z_w^2}/v_1 + \sqrt{x_{i0}^2 + Z_f^2}/v_2 \quad (5)$$

The delay correction amount among the elements is obtained as the relative value. It is obvious that the correction amount also changes due to a change in $Z_w$.

Figure 3:
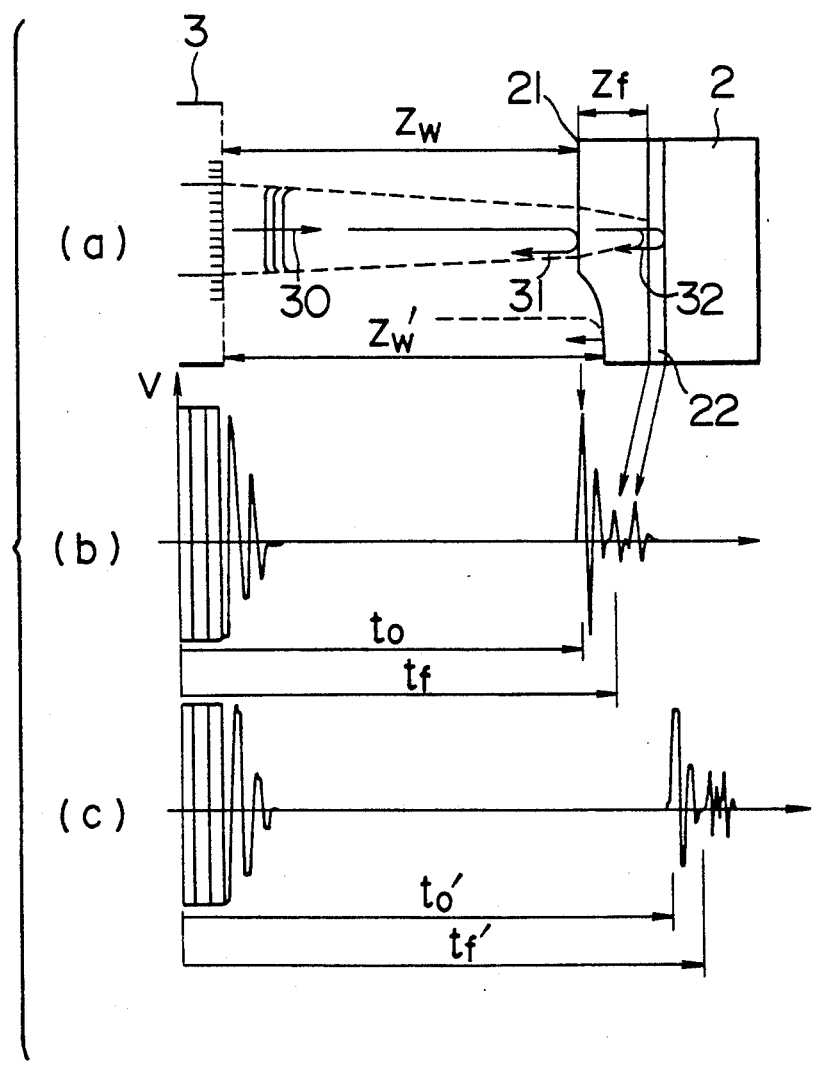
FIG. 3 is a diagram for explaining an influence which is exerted on a medium distance gate opening/closing time.

In FIG. 3, the distance $Z_w$ between the array transducer 3 and the surface 21 of the sample 2 changes to $Z_w'$ in the distorted portion on the surface. On the other hand, it is assumed that the distance $Z_f$ between the surface 21 of the sample and the bonding zone 22 is hardly influenced by the presence or absence of the distortion. As shown in FIG. 3(a), the ultrasonic pulses 30 emitted from the array transducer 3 are partially reflected by the surface 21 and returned as the surface echo 31 to the array transducer 3.

The remaining pulses 30 are propagated in the sample 2 and are further partially reflected by a bonding zone 22 and received as the imaging echo 32 by the array transducer 3. When the reception echo is monitored on a time base, as shown in FIG. 3(b), the surface echo 31 appears at the position of $t_0$ and the imaging echo 32 appears at the position of $t_f$. When the medium distance $Z_w$ changes to $Z_w'$ due to the distortion of the surface 21, as shown in FIG. 3(c), the echoes 31 and 32 move as shown at the positions $t_0'$ and $t_f'$, respectively. The opening/closing times of the gate also need to be corrected in correspondence to the delay times. In this case, by carrying out this correction, the imaging object zone can be displayed in the image display section 13.

According to the embodiment, $Z_w$ is always monitored by the surface echo counter and the delay correcting time and the gate opening/closing times are respectively arithmetically operated and controlled. Thus, the focal point can be always set to an arbitrary position in the sample and the imaging picture can be formed by the echo from the focal zone.

Figure 4:
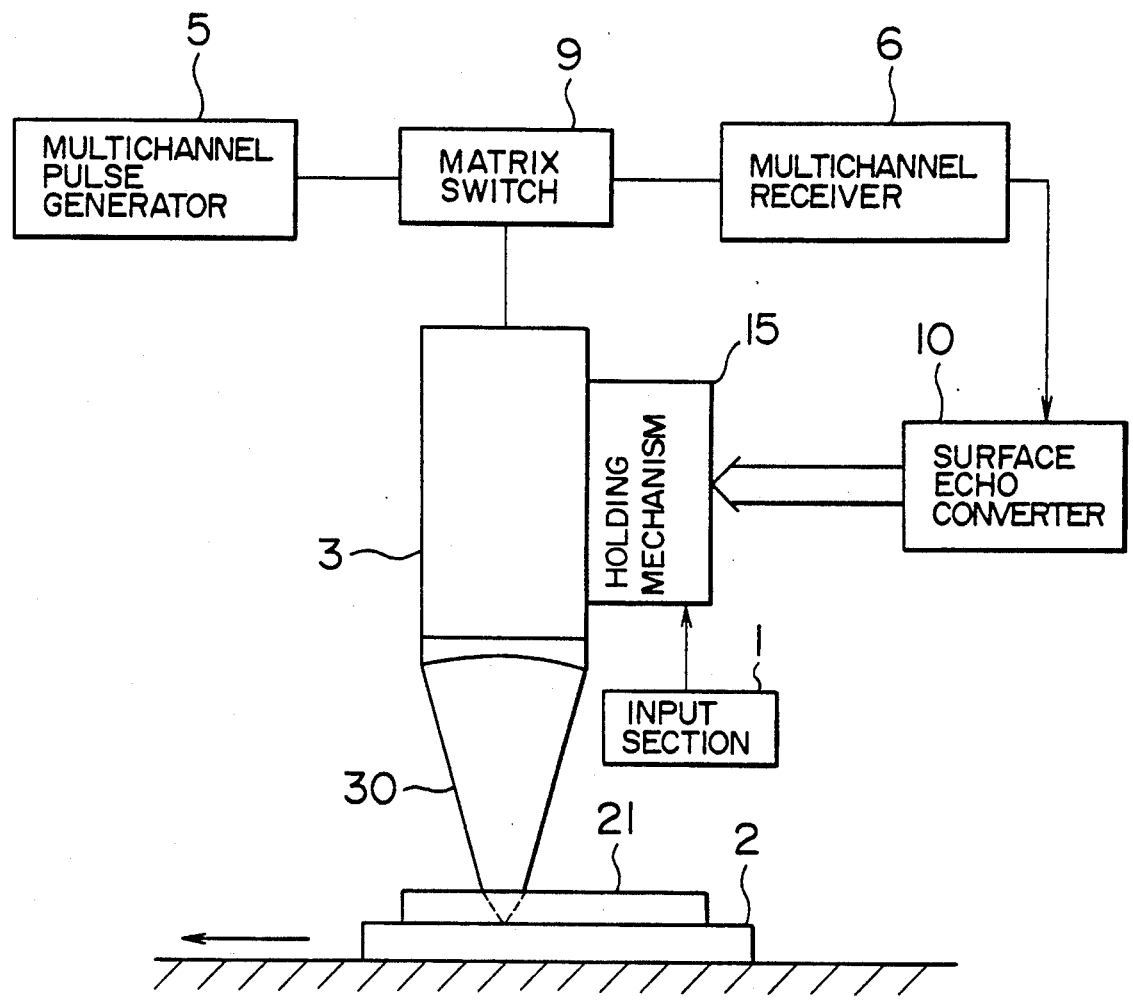
FIG. 4 is a block diagram for explaining a developed embodiment of the invention.

FIG. 4 shows another embodiment of the invention. The mechanism 15 to hold the array transducer 3 further has: a control circuit arithmetic operating section which functions so as to keep constant the distance between the sample surface 21 and the array transducer 3 in accordance with the value of $Z_w$ which is output from the surface echo counter 10; and a Z axis drive control unit which is driven by an ultrasonic motor or the like to move the array transducer 3 on the basis of the result of the arithmetic operation.

According to this embodiment, it is possible to accurately correct for a fine change in $Z_w$.

According to the invention, even in the case of a distorted or inclined sample surface or a curved surface where the control of the focal point position was hitherto difficult, the focal point can be set to an arbitrary surface in the sample at an accuracy higher than with the conventional imaging system and this surface can be imaged at a high resolution. Thus, there is an advantage such that a finer imaging picture is obtained.

What is claimed is:

1. An ultrasonic imaging system comprising:
   ultrasonic transmitting/receiving means including a plurality of vibrating elements for transmitting and receiving an ultrasonic beam;
   pulse generating means for supplying at least one high frequency pulse at a predetermined time, said predetermined time being determined by said ultrasonic transmitting/receiving means;
   receiving means for receiving and amplifying an ultrasonic signal received by said ultrasonic transmitting/receiving means;
   switching means for connecting said pulse generating means with said ultrasonic transmitting/receiving means when said ultrasonic transmitting/receiving means is in a transmitting mode and for connecting the ultrasonic transmitting/receiving means with said receiving means when said ultrasonic transmitting/receiving means is in a receiving mode;
   wherein a liquid medium is interposed between an ultrasonic irradiating surface of the ultrasonic transmitting/receiving means and a test sample, and a predetermined portion in the sample is imaged by said imaging system;
   input means for inputting predetermined parameters regarding said test sample and said liquid medium, said predetermined parameters including at least one of a sound velocity in said test sample, a sound velocity in said liquid medium, a physical dimension of said test sample and a physical dimension of said liquid medium;
   a surface echo counter for extracting an echo of the sample surface from an output signal of said receiving means and for measuring a distance between the ultrasonic irradiating surface and the test sample from a transmission time of the ultrasonic beam and a reception time of said surface echo; and
   focal point arithmetic operation control means for controlling a focus of said ultrasonic beam into said predetermined portion in the sample based on said distance measured by said surface echo counter and an output signal from said input means.

2. A system according to claim 1, wherein said pulse generating means includes a multichannel pulse generator for supplying a high frequency pulse signal to each of said plurality of vibrating elements, said receiving means includes a multichannel receiving for in-phase receiving and synthesizing of signals from said plurality of vibrating elements such that phases of said received and synthesized signals are aligned with a predetermined ultrasonic beam in accordance with said focus of said ultrasonic beam, said connection switching means including a matrix switching circuit.

3. A system according to claim 1, wherein said focal point arithmetic operation control means includes a delay correction amount arithmetic operation control section for outputting control signals to control the phases of the transmission and reception signals, said control signals being output to said pulse generating means and said receiving means.

4. A system according to claim 1, wherein said focal point arithmetic operation control means includes an arithmetic operating means for arithmetically deriving a distance to focus onto the predetermined portion of the sample and a drive apparatus to change the position of said ultrasonic transmitting/receiving means based on the derived distance.

5. A system according to claim 1, wherein said receiving means and an image display section are connected through a gate circuit, said system further including a gate time arithmetic operation control means for receiving output signals from said input means and said surface echo counter, for calculating a period of time from a reflection of an ultrasonic echo from the predetermined portion in the sample to the reception of this ultrasonic echo by said ultrasonic transmitting- /receiving means, and for controlling opening/closing times of a gate of said gate circuit.

6. An ultrasonic imaging system, comprising:
an array transducer for producing an ultrasonic beam, said array transducer including a plurality of vibrating elements, vibration phases of each of the vibrating elements being selectable so as to enable movement of a focal point of said ultrasonic beam;
means for controlling said vibration phases of the vibrating elements on the basis of a first reflection beam from a surface of an object to be imaged so that said focal point is brought to a predetermined position inside of said object; and
means for extracting a second reflection beam from said predetermined position.

7. A system according to claim 6, wherein the object to be imaged is at least one of a plate-like structure and a layered structure.

8. An ultrasonic imaging system comprising:
an array of a plurality of vibrating elements for producing an ultrasonic beam;
control means for controlling said plurality of vibrating elements so that said ultrasonic beam is focused on a focal point at a portion of an object to be imaged, said portion of said object to be imaged being located at a predetermined depth in said object;
means for extracting a reflection beam from said portion of said object to be imaged, wherein said control means includes means for controlling a difference between phases of transmission signals generated from respective adjacent vibrating elements in said array of said plurality of vibrating elements so as to control the location of said portion to be imaged, said means for controlling a difference being operative to control the location of said portion to be imaged based on at least a distance between an ultrasonic beam emitting surface of said array and a surface of the object to be imaged, said predetermined depth of said portion to be imaged and sound velocities of said medium and said object, said distance being obtained based on a reflection beam from said surface of the object.

9. A system according to claim 8, wherein said object is of a laminated structure comprised of a plurality of layers, said portion to be imaged being located on a boundary between at least two adjacent layers, said predetermined depth being a total thickness of layers which exist between said portion to be imaged and said surface of said object.

10. A system according to claim 9, wherein said sound velocity of said object includes a velocity of sound through each of the layers existing between said portion to be imaged and said surface of said object.

11. A system according to claim 8, wherein said control means controls said phase differences on the basis of a transmission time required for a transmission signal generated from each vibrating element to reach said portion to be imaged.

* * * * *